Feb. 19, 1946. F. S. STERNAD 2,395,020
TIRE BUILDING MACHINE
Filed Dec. 24, 1942 2 Sheets-Sheet 1
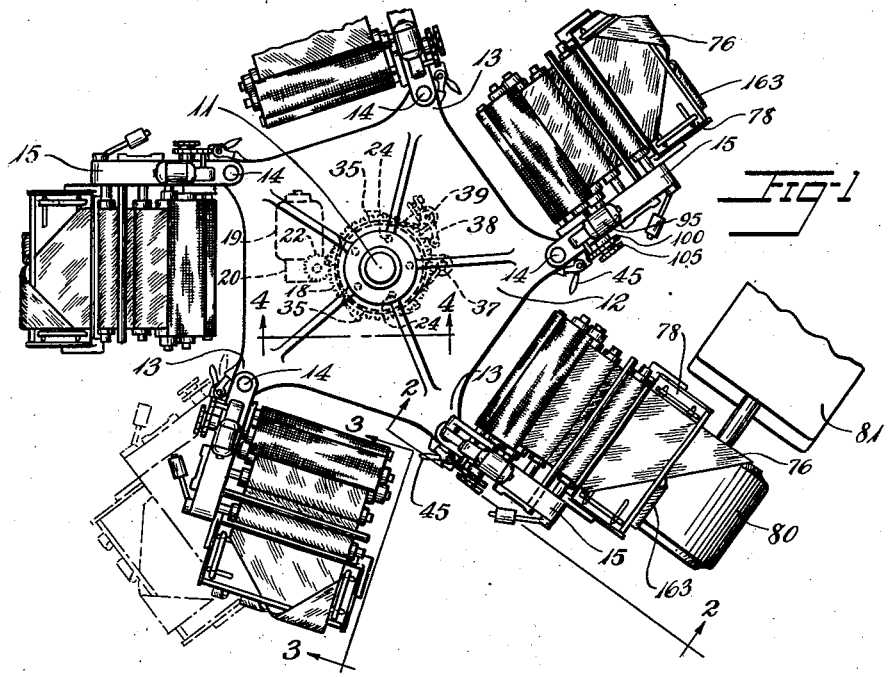
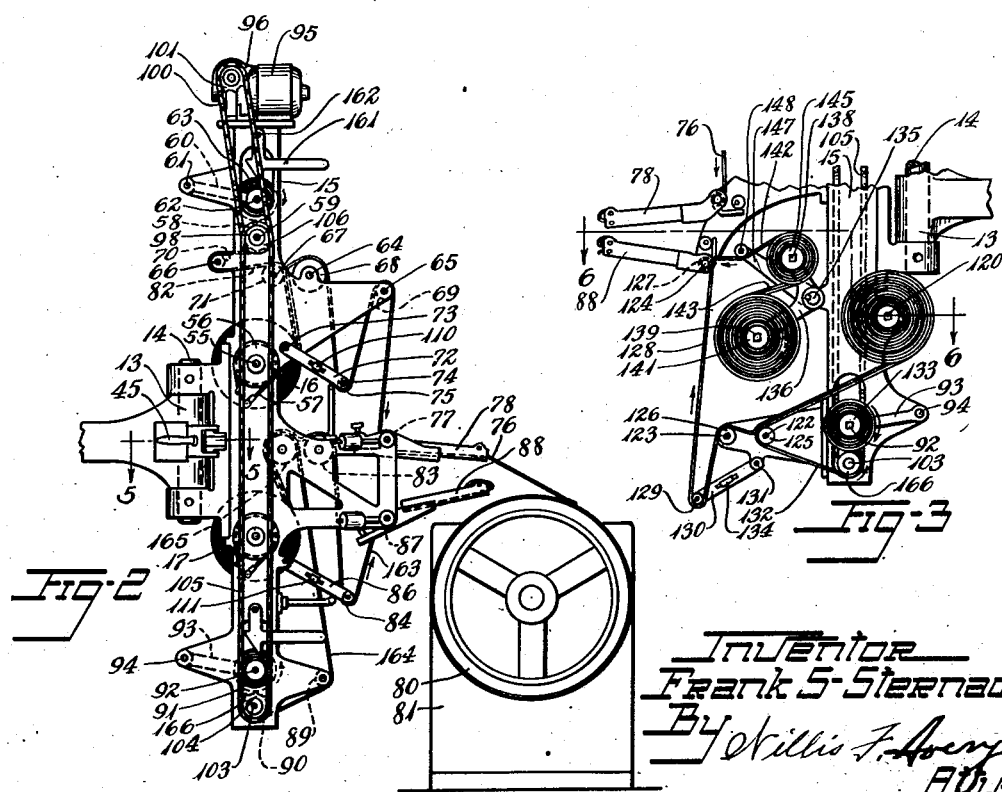
Inventor
Frank S. Sternad
By Willis F. Avery
Atty.

Feb. 19, 1946.  F. S. STERNAD  2,395,020
TIRE BUILDING MACHINE
Filed Dec. 24, 1942  2 Sheets-Sheet 2
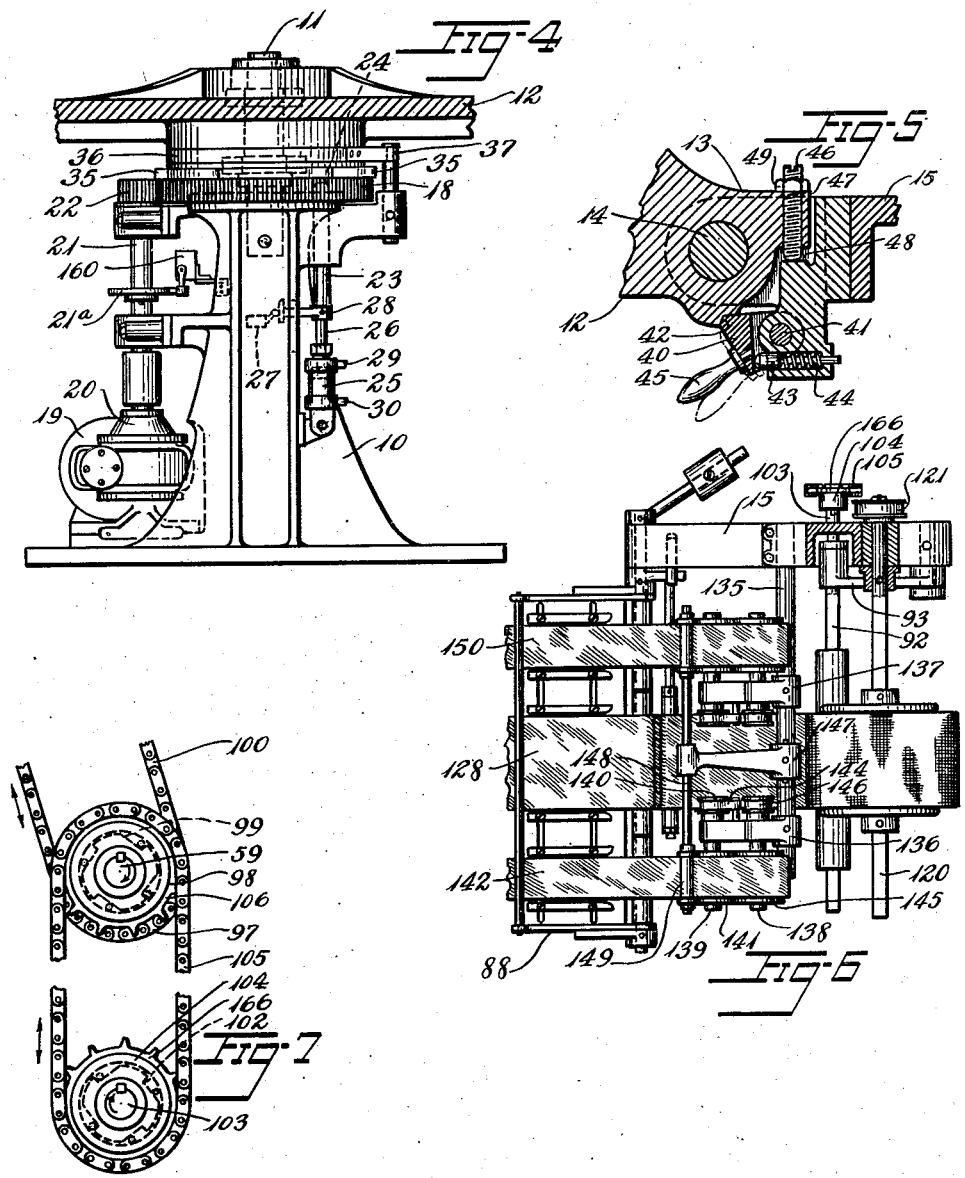
Inventor
Frank S. Sternad
By Willis F. Avery
Atty.

Patented Feb. 19, 1946

2,395,020

UNITED STATES PATENT OFFICE 2,395,020

TIRE BUILDING MACHINE

Frank S. Sternad, Cuyahoga Falls, Ohio, assignor to The B. F. Goodrich Company, New York, N. Y., a corporation of New York Application December 24, 1942, Serial No. 470,070

14 Claims. (Cl. 154—10)

This invention relates to tire building machines and is especially useful in storing and delivering strip material to the tire building former.

Construction of tire casings of large size requires use of a great many different strips, and apparatus proposed heretofore for storing and delivering the materials to the operator at the building form has in some cases been objectionably limited as to the number of different strips which it could store and supply at one time. Prior attempts to increase the storing capacity have resulted in the rolls of stock interfering with each other in loading the apparatus, and correct alignment of the strips upon the building form has at times been difficult.

Prior stock-carrying apparatus has also required much muscular exertion on the part of the operator in withdrawing stock therefrom.

The present invention aims to overcome the foregoing and other difficulties and to provide improved apparatus.

The principal objects of the invention are to provide storage capacity for a multiplicity of stocks, to provide for selective power-operated delivery of the stocks with power-operated winding of the liners, to provide accessibility in loading, to provide accuracy of alignment, and to provide power-operated indexing to bring the desired stocks to the delivery position.

These and other objects will appear from the following description and the accompanying drawings.

Of the drawings:

Fig. 1 is a plan view of apparatus constructed in accordance with and embodying the invention showing in full lines a plurality of stock racks in delivering position with relation to their supporting mechanism, and in dot and dash lines showing the loading position of one of the racks, the tire building former and its drive being also shown, parts being broken away.

Fig. 2 is an elevation of the former and its drive and one of the stock racks, taken on line 2—2 of Fig. 1, parts being broken away.

Fig. 3 is a detail elevation of the lower part of one of the stock racks taken on line 3—3 of Fig. 1, showing a modification thereof, parts being broken away.

Fig. 4 is a side elevation, partly in section and taken on line 4—4 of Fig. 1 of the supporting and indexing stand, parts being broken away.

Fig. 5 is a sectional detail view of the rack lock, taken on line 5—5 of Fig. 2, parts being broken away.

Fig. 6 is a sectional detail view taken on line 6—6 of Fig. 3, parts being broken away.

Fig. 7 is a detail view of the liner winding clutches and their driving chains and sprockets, other parts not being shown.

In the embodiment of the invention illustrated, a plurality of stock racks are hingedly supported by rotatable means such as a table and may be locked in delivering positions with respect thereto or swung on their hinges to provide greater loading space, the table is adapted to be indexed by power to bring the stock racks into alignment accurately with a building form and each rack is supplied with a plurality of stock supply rolls and liner windup mechanism adapted to be operated selectively by power.

Referring to the drawings, the numeral 10 designates a stationary pedestal having a vertically disposed journal 11 about which a rotatable means such as a table 12 is rotatably mounted. The table 12 is formed at its periphery with a multiplicity of equally spaced knuckles 13 for supporting vertical pivot pins 14 rotatable therein, to which are secured swinging stock racks 15. Each stock rack supports a plurality of stock rolls 16, 17 and is capable of being locked to the table 12 in position to feed stock or to be swung to one side, as indicated in the dot-and-dash line position of Fig. 1, for loading purposes, the stock rolls and other spindles being supported by the racks in cantilever positions or at one side of the rack to assist in loading.

For rotating the table 12, a spur gear 18 is fixed thereto and is adapted to be driven by a motor 19 through a speed reducer 20 which drives a shaft 21 to which a pinion 22 is fixed in position to mesh with the gear.

For stopping the table with its stock racks aligned with the building form, a locking pin 23 is vertically mounted for sliding movement on the pedestal 10, and the table 12 is formed with a plurality of circumferentially spaced openings 24 to receive the end of the pin. A double-acting fluid-pressure operated cylinder 25 is also mounted on the frame with its piston rod 26 fixed to the locking pin for moving it vertically. The electric motor 19 has a limit switch 27 in its control circuit and fixed to the pedestal 10. An arm 28 fixed to pin 23 holds the switch open when the locking pin is elevated and closes it when it is lowered. The arrangement is such that by supplying fluid pressure to the piston rod end of cylinder 25 through a pipe 29 and exhausting the closed end of the cylinder through a pipe 30, the locking pin is lowered, freeing the table for rotation and at the same time switch 27 is closed starting motor 19, and by then admitting pressure fluid to cylinder 25 through pipe 30 and exhausting it through pipe 29, pin 23 is forced upwardly against table 12 in position to enter the next index hole and switch 27 is opened. A cam 21a is fixed to shaft 21 and a limit switch 160 is mounted adjacent thereto and electrically in the motor circuit. This switch is normally closed but is adapted to be opened by cam 21a after the table approaches its next stopping position. The table 12 is formed with a plurality of cam surfaces 35 corresponding in number to the stock racks and spaced circumferentially of the table. A band brake 36 engages about a cylindrical portion of the table and has one end fixed to the pedestal 10, as at 37. The other end is pivotally connected to one arm of a bell crank 38 pivotally fulcrumed on the pedestal at 39. The other arm of the bell crank stands in position to engage cam surfaces 35 as they pass and thereby to tighten the brake. The arrangement is such that as the table approaches a locking position, and limit switch 160 is opened, the brake is tightened and brings the table substantially to rest at the locking position where the pin 23 locks it in place.

For locking the stock racks 15 in position with respect to the table 12, referring to Fig. 5, a detent 40 is pivotally mounted at 41 to the rack 15 in position to engage a shoulder 42 of the knuckle 13. A spring plunger 43 is slideably mounted on the rack 15 and is forced by a compression coil spring 44 to hold the detent into locking position. A handle 45 is fixed to the detent. A stop screw 46 is threaded through a lug 47 on the knuckle and abuts against a shoulder 48 of the stock rack. It is held in adjustment by a nut 49. The arrangement is such that in the normal position of the stock rack, where its rolls are parallel to the tire former, the screw 46 engages the shoulder 48 and the detent 40 engages the shoulder 42 so that the rack is locked against swinging on its pivot pin 14, and when it is desired to load the rack the handle 45 may be moved to release the detent permitting the rack to be swung in a clockwise direction as seen in Figs. 1 and 5.

The stock racks 15 may all be of one construction and only one will therefore be described as follows:

For supporting the roll 16 of strip material, a shaft 55 is journaled near one end thereof through the rack frame and has a brake disc 56 fixed thereto at one side of the rack frame. The other end of the shaft is squared in cross-section to receive a stock shell and has a collar removably secured at its outboard end to retain the stock shell. A brake 57 is fixed to the rack frame 15 and engages about the brake drum to act as a drag.

For rewinding the liner, a driven roll 58 is fixed to a shaft 59, journaled in the rack 15. A swinging arm 60 is pivoted on the rack frame, as at 61 and carries a shaft 62 about which a stock shell 63 is rotatably mounted. The shell 63 rests on the roll 58 and a liner passing over roll 58 will be wound upon shell 63. For holding the windup roll in its raised position, a cam latch 161 is pivotally mounted, as at 162, on rack frame 15. The arrangement is such that as the rewind roll builds up its shaft engages the inclined cam surface and pushes the latch to one side until it has passed above the cam portion, whereupon the latch swings into retaining position by the force of gravitation. Shafts 64, 65, 66, and 67 are fixed to the rack 15 and carry free running idler rolls 68, 69, 70, and 71 respectively for guiding the stock and the liner. A swinging arm 72 is pivoted at 73 to the rack 15 and supports at its outer end a shaft 74 having a free running idler roller 75 thereon. The arrangement is such that the strip 76 of stock from roll 16 is carried up and over roller 68, then down under roller 75 and then up and over roller 69. The strip then proceeds under an idler roller 77 and along a swinging guide 78 onto the former or drum 80. The former is driven by a drive 81 and in pulling the strip of stock raises roller arm 72.

At the same time the liner 82 which separates the convolutions of the strips 76 on roll 16 passes from that roll about roller 71, then under and about roller 70, then under and about roller 58 and then about stock shell 63 where it is rewound.

At the lower part of the stock rack similar apparatus for guiding the strip 163 from roll 17 and for rewinding the liner 164 therefrom is provided. The strip 163 passes up and over a roll 165, then over a roll 83, downwardly under a roll 84 carried by a swinging arm 86, then up and over a roll 87 and swinging guide 88 onto the former 80. Its liner 164 travels downwardly from roll 165 over a guide roller 89 and under and about a roll 90 where it is wound up on a shell 91 supported by a shaft 92 carried by a swinging arm 93 pivoted at 94 to the stock frame.

For delivering the strips 76 and 163 substantially free from tension, an electric motor 95 is mounted on the stock rack 15 and is directly connected to a speed reducer 96. A sprocket 97 is fixed to one member 98 of a roller clutch, the other member 99 of which (see Fig. 7) is fixed to shaft 59. Sprocket 97 is connected by a chain 100 with a sprocket 101 on the speed reducer 96. A similar roller clutch has one of its members 102 fixed to a shaft 103 to which roll 90 is fixed, and its other member 104 is rotatable about the shaft 103 and carries a sprocket 166 adapted to be driven by a chain 105 from a sprocket 106 fixed to clutch member 98 which is rotatable about shaft 59. The two roller clutches are so arranged that one drives in a clockwise direction only and the other in a counter-clockwise direction only. Motor 95 is reversible and may drive the sprockets in either direction. The arrangement is such that when sprocket 101 is driven in a clockwise direction as seen in Fig. 2 liner 82 is drawn about roll 58 and rewound, and when driven in a counter-clockwise direction liner 164 is drawn about roll 90 and rewound.

For starting and stopping the motor 95 a mercury switch 110 is mounted on arm 72 so that in the lowered position of the arm the motor circuit is opened and in the raised position of the arm the motor is started in a direction to drive the sprocket 101 counter-clockwise. A mercury switch 111 is also mounted on arm 86 and so arranged that when arm 86 is lowered the motor circuit is opened and when the arm is raised the switch is closed and starts motor 95 in the opposite direction.

In the operation of the stock racks, the operator pastes the leading end of one of the strips on the tire form, for example, strip 76 as shown in Fig. 2, and starts the former rotating. This draws the strip onto the form causing arm 72 to be raised. This starts motor 95 which rotates roll 58 rewinding the liner. When the operator cuts the strip and releases it from the former, arm 72 returns to its lowered position by the force of gravitation and motor 95 stops. When the other strip 163 is drawn forward and pasted on the former and the former rotated, lever 86 is raised starting the motor 95 in the opposite direction and winding the liner 164 on shell 91.

One or more of the stock racks 15 may be equipped to handle additional strips of stock as where a plurality of narrow strips, such as chafing or bead-cover strips and breaker or filler strips are required. As shown in Figs. 3 and 5, which illustrate this modification, the stock racks for supporting such narrow strips are modified as follows:

The stock rack 15 is similar to that described above at its upper portion but at its lower portion the rack rotatably supports a squared shaft 120 similar to shaft 55 and having similar braking equipment, such as the brake drum 121. The rack also supports fixed shafts 122, 123 and 124, about which freely rotatable guide rollers 125, 126, 127 are respectively journaled. Strip 128 travels from the supply shell on shaft 120 over rollers 125 and 126 and under a roller 129 carried by a swinging arm 130 pivoted at 131 to the rack 15, then about roll 124 and over the guide 88 to the former. The liner 132 after leaving roll 125, which it approaches from the shell on shaft 120 with the stock strip 128, is led under driven roll 166 on shaft 103 and winds up on the shell 133 on shaft 92. Arm 130 has a mercury switch 134 which controls motor 95 in the same manner as switch 111 previously described.

For supporting and feeding the bead-covering strips, a horizontal rod 135 is fixed to rack frame 15 and this in turn supports a pair of brackets 136, 137 (see Fig. 6), fixed thereto. Bracket 136 carries a pair of horizontally disposed shafts 138, 139 journaled therein. Shaft 139 is provided with a brake drum 140 fixed thereto at one side of the bracket. The other end of the shaft is squared to fit a stock shell 141 which supports a stock strip 142 and a liner 143 interwound thereon. A brake band 144 is fixed to the bracket 136 and contacts the brake drum 140 to apply friction thereto against overrunning.

Shaft 138 is similar to shaft 139 and is squared to receive a shell 145. It has a brake drum 146 which may also be engaged by a brake band mounted on the bracket if desired. Rod 135 also supports an arm 147 fixed thereto, which in turn supports a shaft 148. A free-running guide roller 149 is rotatably mounted on shaft 148 between stop collars and in alignment with the strip 142. The arrangement is such that the strip 142 is led from shell 141 up and about shell 145 where its liner 143 is wound up and continues under guide roll 149, then over the swinging guide 88 between adjustable guide fences.

Bracket 137 and its associated shafts, rollers, and brakes are arranged in reverse of those on bracket 136 so that one may be loaded from the left side and one from the right side, but their operation is identical. The strip 150 is delivered over the same swinging guide 88 and strips 128, 142 and 150 may be delivered simultaneously.

In the operation of the apparatus the swinging stock racks are supplied with stock rolls of strip material and empty shells for receiving the liners, the ends of the liners are drawn from the stock rolls and wrapped once about the empty shells, then sufficient strip stocks are withdrawn to thread the ends about the guide rolls and over the swinging guides. The strips may then be drawn out in succession and pasted on the tire form. By rotation of the form, the swinging guide roll 75, 84 or 129 depending upon which strip is being withdrawn, is raised by withdrawal of the strip, starting the motor 95 in the proper direction to receive the liner and assist in advancing the strip. When the strip has been laid about the form, the portion so applied is cut, by hand, from the remaining strip and released, whereupon the swinging guide roll 72, 86, or 130 is lowered by the release of tension, and stops the motor 95.

When the liner rewind shells are full they are retained by their gravity-operated latches. When stock rolls or liner rolls are to be changed, the lever 45 is pulled away from the knuckle and the stock rack may be swung on the knuckle to a position where its rolls may be removed and replaced. After replacement the rack may be swung to its feeding position and locked to the rotatable support.

The location of the stock racks for rotation about a vertical axis of the table and the locking means therefor, provide accurate alignment of the stock racks with building forms or drums of different dimensions, and the adjustment provided by set screws 46 and stops 48 provide for individual accurate alignment of each stock rack with the drum and provides for accurate return when the racks have been swung away from their locked positions for loading purposes.

When it is desired to move one stock rack out of alignment with the tire form and another into alignment, the operator momentarily actuates a four-way valve (not shown) admitting pressure fluid to the top of cylinder 25 and exhausting the lower end. This lowers the locking pin 23 and simultaneously starts motor 19 rotating the table or support 12. Release of the valve reverses it by spring pressure, but the locking pin has been withdrawn and is not aligned with an opening and the circuit to motor 19 is held closed by a holding circuit about limit switch 27. During rotation of shaft 21, its cam 21a opens the limit switch 160 stopping the motor and simultaneously a cam surface on the table 12 applies the brake 36. In the meantime the pressure in pipe 29 has been released and has been applied to the lower end of cylinder 25 so that locking pin 23 is urged upwardly and enters one of the locking holes in the table as the hole becomes aligned therewith.

The apparatus provides for handy storage and delivery of a multiplicity of different strips in accurate alignment with the building form, and it relieves the operator from much muscular exertion, thereby increasing the production of tires.

Variations may be made without departing from the scope of the invention as it is defined by the following claims.

I claim:

1. Tire-building apparatus comprising means rotatable about an axis for supporting a stock supply, means for locking said rotatable means in a plurality of positions, power-operated means for moving the rotatable means from one locking position to another, brake means for counteracting inertia of the rotatable means as it approaches a locking position, and means responsive to rotation of said rotatable means for applying said brake means as the rotatable means approaches the locking position.

2. Tire-building apparatus comprising means rotatable about an axis for supporting a stock supply, power-operated means for turning the rotatable means about its axis, a pin for locking the rotatable means in a plurality of positions, a brake means for counteracting inertia of the rotatable means as it approaches a locking position, said brake means being normally out of braking contact with said rotatable means, means actuated by movement of the locking pin for automatically disconnecting the power from said rotatable means as the rotatable means approaches a locking position, and means in the path of rotation of said rotatable means for applying said brake means to said rotatable means as said rotatable means approaches a locking position.

3. Tire-building apparatus comprising means rotatable about an axis for supporting a stock supply, and a plurality of stock racks carried thereby, at least one of said stock racks being hinged to said rotatable means for movement with relation to another stock rack thereon to provide additional room for loading purposes.

4. Tire-building apparatus comprising means rotatable about a vertical axis for supporting a stock supply, and a plurality of stock racks hingedly supported thereby for movement relative thereto about vertical axes, each stock rack having means for locking it to said supporting means in a stock-feeding position.

5. Tire-building apparatus comprising means rotatable about a vertical axis for supporting a stock supply, and a plurality of stock racks hingedly supported thereby for movement relative thereto about vertical axes, each stock rack being of open-side construction for side loading.

6. Tire-building apparatus comprising a tire former, a stock rack for supporting rolled strip material and an interwound liner, a movable guide mounted thereon in the path of the material for movement independent of the position of said former for guiding the strip material on its way to said tire former, power-operated means for rewinding the liner and advancing the strip material, and means controlled solely by the position of said guide independent of said former for controlling the application of power to said power-operated means.

7. Tire-building apparatus comprising a tire former, a stock rack for supporting a plurality of stock-feeding means each comprising a roll of stock, means for rewinding a liner therefrom, and a guide mounted in the path of the material for movement independent of the position of said former, power-operated motor means for selectively driving the rewinding means, and means actuated by movement of said guide independent of said former for controlling the operation of said motor means.

8. Tire-building apparatus comprising a stock rack for supporting a plurality of stock-feeding means each comprising a roll of stock and each comprising means for rewinding a liner therefrom, a single driving means rotatable in opposite directions for driving each of the rewinding means and clutch means, between said driving means and each rewinding means, said clutch means being adapted to drive only in one direction and each clutch means being arranged for driving in a different direction for selectively driving said rewinding means.

9. Tire-building apparatus comprising means rotatable about an axis for supporting a stock supply, a plurality of stock racks hingedly supported thereby for movement relative thereto about axes parallel to the axis of the stock supply, each stock rack comprising stock supply means and liner unwinding means, and power-operated means on said stock rack for driving said rewinding means.

10. Tire-building apparatus comprising means rotatable about an axis for supporting a stock supply, a plurality of stock racks hingedly supported thereby for movement relative thereto, each stock rack comprising a plurality of stock supply means and liner rewinding means, and power-operated means on said stock rack for selectively driving said rewinding means.

11. Tire-building apparatus comprising means rotatable about a vertical axis for supporting a stock supply, power-operated means for rotatably adjusting said means about its axis, means for locking it in positions of adjustment, a plurality of stock racks, hinge means connecting said racks to said rotatable means at intervals thereabout, and means for locking said stock racks with respect to said rotatable means.

12. Tire-building apparatus comprising a pair of stock supply rolls, a liner windup roll for each supply roll for withdrawing a liner therefrom, a reversible motor, means including a clutch at each windup roll for driving the windup roll from said motor, said clutches being each arranged for driving in one direction only, and each clutch being arranged for driving in a different direction.

13. Tire-building apparatus comprising a pair of stock supply rolls, reversible driving means, means for driving one stock supply roll from said driving means when said driving means is rotated in one direction, and means for driving the other stock roll therefrom when said driving means is rotated in the opposite direction.

14. Tire-building apparatus comprising means rotatable about an axis for supporting a stock supply, a plurality of stock racks carried thereby, at least one of said stock racks having hinge means connecting it to said rotatable means for movement with relation to another stock rack thereon to provide additional room for loading purposes, and means for locking the stock rack in alignment with a building drum.

FRANK S. STERNAD.